(12) United States Patent
Shawcross et al.

(10) Patent No.: US 6,454,845 B1
(45) Date of Patent: Sep. 24, 2002

(54) PHTHALOCYANINE COMPOUNDS USED IN INKS FOR INK-JET PRINTING

(75) Inventors: Andrew Paul Shawcross; Gavin Wright; Roy Bradbury, all of Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/744,905

(22) PCT Filed: Jul. 28, 1999

(86) PCT No.: PCT/GB99/02453

§ 371 (c)(1),
(2), (4) Date: Jan. 31, 2001

(87) PCT Pub. No.: WO00/08103

PCT Pub. Date: Feb. 17, 2000

(30) Foreign Application Priority Data

Aug. 8, 1998 (GB) ............................................... 9817235

(51) Int. Cl.$^7$ ......................... C09D 11/02; C09B 47/04
(52) U.S. Cl. ............................... 106/31.49; 106/31.78; 540/133; 540/134
(58) Field of Search ........................... 106/31.49, 31.78; 540/133, 134

(56) References Cited

U.S. PATENT DOCUMENTS

| | | | | |
|---|---|---|---|---|
| 4,247,337 A | * | 1/1981 | Irvine et al. ............. | 106/31.76 |
| 5,296,023 A | * | 3/1994 | Gregory et al. .......... | 106/31.46 |
| 5,882,360 A | * | 3/1999 | Bauer et al. .............. | 106/31.47 |
| 6,149,722 A | * | 11/2000 | Robertson et al. ....... | 106/31.47 |
| 6,190,422 B1 | * | 2/2001 | Carr ......................... | 106/31.49 |
| 6,235,096 B1 | * | 5/2001 | Meyrick et al. .......... | 106/31.43 |

FOREIGN PATENT DOCUMENTS

| | | |
|---|---|---|
| DE | 34 11 476 | 10/1984 |
| EP | 173 376 | 3/1986 |
| EP | 398 620 | 11/1990 |
| EP | 519 395 | 12/1992 |
| EP | 559 309 | 9/1993 |
| FR | 1 546 057 | 11/1968 |

* cited by examiner

*Primary Examiner*—Helene Klemanski
(74) *Attorney, Agent, or Firm*—Pillsbury Winthrop LLP

(57) ABSTRACT

Phthalocyanine compounds of Formula (1) have utility as colorants in inks for ink-jet printing, where Formula (1) represents:

$$M_vPc(SO_2NHAr)_x \qquad \text{Formula (1)}$$

in which:

M represents a metal or H;

Pc represents a phthalocyanine nucleus;

Ar represents an aromatic moiety optionally substituted by one or more groups selected from an optional substituent or optionally substituted $C_{1-30}$carbyl;

v is the valence of Pc divided by the valence of M; and x is from 2.5 to 4.5.

12 Claims, No Drawings

PHTHALOCYANINE COMPOUNDS USED IN INKS FOR INK-JET PRINTING

This application is the national phase of international application PCT/GB99/02453 filed Jul. 28, 1999 which designated the U.S.

This invention relates to compounds, to ink compositions comprising them and to the use of such inks in ink jet printing ("IJP"). IJP is a non-impact printing technique in which droplets of ink are ejected through a fine nozzle onto a substrate without bringing the nozzle into contact with the substrate.

There are many demanding performance requirements for colorants and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

It is essential that colorants used in IJP have good solubility (preferably in aqueous systems) so they can be dissolved in an ink and fired from the ink-jet head without coming out of solution and blocking the nozzle. Yet colorants that have good operability (i.e. high water solubility) are likely to produce prints of poor water fastness due to the same high water solubility. A significant challenge in designing new colorants for IJP is to provide in the same molecule the apparently mutually exclusive properties of good operability for the ink and yet high water fastness for the print. This often requires the synthesis of a colorant molecule of complex structure comprising many different functional groups and such complex molecules can be expensive and difficult to prepare in high yield.

It would be advantageous to provide colorants which overcome some or all of the preceding disadvantages.

Therefore according to the present invention there are provided one or more compounds of Formula (1) and salts thereof:

$$M_vPc(SO_2NHAr)_x \quad \text{Formula (1)}$$

in which:
M represents a metal or H;
Pc represents a phthalocyanine nucleus;
Ar represents an aromatic moiety optionally substituted by one or more groups selected from an optional substituent or optionally substituted $C_{1-30}$ carbyl;
v is the valence of Pc divided by the valence of M; and
x is from 2.5 to 4.5.

The applicant has discovered that the above phthalocyanine compounds have particular utility as colorants for use in IJP. For example they can produce IJ prints which exhibit good optical density, water fastness, light fastness and/or a particularly attractive cyan shade. They are particularly useful for formulating IJP inks comprising a resin component.

The compounds of the present invention described herein include all chemical and physical forms thereof (such as those described herein). Preferred compounds are those which are IJP-effective.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, halo, methyl and/or methoxy; and includes all direct combinations of a plurality (preferably two) of these groups (e.g. amino and sulphonyl combined are sulphamoyl). Preferred optional substituents comprise: carboxy, sulpho, hydroxy, amino, mercapto, cyano, halo, methyl (optionally substituted by one or more halo) and/or methoxy (optionally substituted by one or more halo).

The term 'carbyl' as used herein denotes any organic radical moiety which comprises one or more carbon atoms and optionally one or more other heteroatoms preferably selected from: hydrogen, phosphorus, halo, nitrogen, oxygen and/or sulphur, more preferably from hydrogen, nitrogen, oxygen and/or sulphur. The term 'hydrocarbyl' as used herein denotes any radical moiety which comprises one or more hydrogen atoms and one or more carbon atoms. Most preferably 'carbyl' moieties comprise one or more of the following carbon containing moieties (including combinations thereof in the same moiety): alkyl, alkoxy, alkanoyl, carboxy, and/or formyl in optional combination with one or more of the following hetero-atom containing moieties (including direct combinations of a plurality (preferably two) of the hetero-atom moieties, (e.g. amino and sulphinyl combined are sulphinamoyl): oxy, thio, sulphinyl, sulphonyl, amino, imino and/or nitrilo. Carbyl moieties may also comprise one or more double and/or triple carbon to carbon bonds and/or aromatic moieties. The optional hetero-atom and/or unsaturated groups may be located in any position in a carbyl moiety, optionally interrupting a chain.

The term 'alkyl' or its equivalent (e.g. 'alk') as used herein may be readily replaced, where appropriate, by terms encompassing other similar moieties (e.g. other hydrocarbyl moieties) such as those comprising double bonds, triple bonds, and/or aromatic moieties (e.g. alkenyl, alkynyl and/or aryl) as well as multivalent species attached to two or more substituents (such as alkylene). The term 'halo' as used herein signifies fluoro, chloro, bromo and iodo, preferably fluro and chloro.

When M is a metal it is preferably selected from Li, Na, K, Mg, Ca, Ba, Al, Si, Sn, Pb, Rh, Sc, Ti, V, Cr, Mn, Fe, Co, Ni and Cu, more preferably from Sc, Ti, Va, Cr, Mn, Fe, Co, Zn, Ni and Cu; especially from Ni and Cu, particularly Cu.

It will be appreciated that v (which denotes the stoichiometric ratio of M to Pc) is the molar ratio which produces a stable complex. It can readily be determined from the relative valences of Pc and M (e.g. v=Pc/M). Preferably, where Pc can be represented as a radical moiety of formula (2):

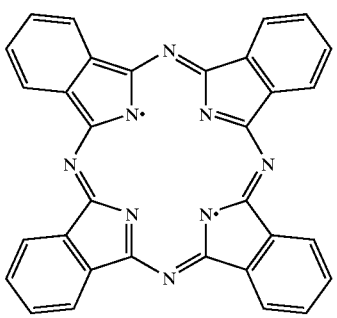

Formula (2)

(where the valence of Pc is 2) then v is inverse half the valence of M.

It will also be appreciated that because of the nature of the preparation of compounds of the present invention, in general they may exist as a mixture of different compounds. Thus in Formula (1) the values for v and x may represent averages for the mixture. Insofar as purification techniques will allow, it is preferred that the mixture comprises one compound as the major component, more preferably the mixture is substantially free of other compounds of Formula (1).

Preferably x is from 2.8 to 4.2, more preferably from 3.0 to 4.0, most preferably 3 or 4.

In the plurality of —$SO_2NHAr$ groups attached to the Pc nucleus, the Ar group when substituted may be independently substituted by different substituents on each Ar group.

Preferably Ar represents an aromatic moiety, more preferably aryl, most preferably phenyl, where the aromatic moiety is optionally substituted by one or more $C_{1-30}$hydrocarbyl groups optionally interrupted by one or more bivalent radical moieties selected from —O—; —CO—; —OCO—; —COO—; —S—; —SO— and —$SO_2$.

Preferred compounds of Formula (1) are those in which:

M is Cu or Ni,

Ar is a aryl group optionally substituted by one or more groups selected from: halo; cyano, nitro, optionally substituted $C_{1-18}$hydrocarbyl; $COOR^1$; $OCOR^1$; $COR^1$; $COCOR^1$; $SO_2R^1$; $SO_2OR^1$; $OSO_2R^1$; $NHCOR^1$ and $CONHR^1$; where $R^1$ independently represents H or optionally substituted $C_{1-18}$hydrocarbyl; and any of the above hydrocarbyl groups may independently be optionally interrupted by one or more of —O—; —CO—; —OCO—; —COO—; —S—; —SO— and —$SO_2$.

More preferred compounds of Formula (1) are those in which:

M is Cu,

Ar is phenyl optionally substituted by one or more groups selected from: halo; cyano, nitro, optionally substituted $C_{1-12}$alkyl; optionally substituted $C_{1-12}$alkenyl; optionally substituted $C_{1-12}$alkynyl; optionally substituted aryl; (optionally fused to the aryl ring to/form polycyclic aromatic system); $COOR^1$; $OCOR^1$; $COR^1$; $COCOR^1$; $SO_2R^1$; $SO_2OR^1$; $OSO_2R^1$; $NHCOR^1$ and $CONHR^1$; where $R^1$ independently represents H or optionally substituted $C_{1-12}$alkyl; optionally substituted $C_{1-12}$alkenyl; optionally substituted $C_{1-12}$alkynyl; and any of the above alkyl, alkenyl and alkynyl groups may independently be optionally interrupted by one or more of —O—; —CO—; —OCO—; —COO—; —S—; and —$SO_2$.

Most preferred compounds of Formula (1) are those in which:

M is Cu,

Ar is phenyl optionally substituted by one or more groups selected from: halo; cyano, nitro, optionally substituted $C_{1-18}$alkyl; $COOR^1$; $OCOR^1$; $COR^1$; $COCOR^1$; where $R^1$ independently represents H or optionally substituted $C_{1-12}$alkyl; any of the above alkyl groups may independently be optionally interrupted by one or more of —O—; —CO—; —OCO—; and —COO—.

Specific compounds of Formula (1) are selected from the compound exemplified herein and any IJP-effective forms thereof.

Optionally compounds of the present invention may be dyes, preferably water soluble dyes. However if dyes of the present invention are to be formulated in polymer containing inks (see below) they are optionally insoluble in water but soluble in the (water-dissipatable) polymer. Such dyes are preferably free from carboxy and sulpho groups, and more preferably are disperse or solvent-soluble dyes. Disperse and solvent soluble dyes are distinct from pigments in that pigments are insoluble in organic solvents and polymers whereas disperse and solvent soluble dyes are soluble in organic solvents and polymers.

Any radical group mentioned herein as a substituent refers to a monovalent radical unless otherwise stated. A group which comprises a chain of three or more atoms signifies a group in which the chain may be straight or branched or the chain or any part of the chain may form a ring. Substituents may replace any H attached to an atom in the ring (e.g. Pc nucleus) or chain which is chemically suitable and may be located at any available position on the ring or chain. Preferably the substituents on the Pc nucleus are positioned so that none of its phenyl moieties have more than one substituent. The total number of certain atoms is specified herein for certain substituents, for example $C_{1-m}$alkyl, signifies an alkyl group having from 1 to m carbon atoms.

Unless the context clearly indicates otherwise, as used herein plural forms of the terms herein are to be construed as including the singular form and vice versa.

The term 'IJP effective' (for example with reference to the inks, compositions, ingredients, substituents and/or compounds described herein) will be understood to mean effective for use in ink-jet printing by for example: providing desirable properties to the ink, being compatible with any inert carriers and/or diluents suitable for formulating such inks, being compatible with ink jet printers and/or capable of being ink-jet printed. In relation to the processes described herein effective compounds are those which will undergo the specified reactions to form the compounds of the present invention. Preferably compounds acceptable for use in IJP are Ames negative.

It will be appreciated compounds of Formula(1) may exist in many different physical and chemical forms which also form part of the present invention. These forms may comprise any of the following (including mixtures thereof and combinations thereof in the same molecular moiety): salts, stereoisomers (e.g. enantiomers, diastereoisomers, geometric isomers, tautomers and/or conformers), zwitterions, polymorphic forms (e.g. phases, crystalline forms, amorphous forms, solid solutions and/or interstitial compounds); complexes (e.g. in addition to the metal Pc complexes described herein, chelates, solvates, hydrates and/or complexes with any other suitable ligand) and/or isotopically substituted forms (optionally radio-active, e.g. used as means for selective imaging of the compounds and/or inks containing them and/or as tools to investigate their mode of action in IJP).

Compounds of Formula (1) may have many uses other than IJP. For example as well as colorants for IJP inks, compounds of the present invention may be used as intermediates in the preparation and/or purification of other compounds of Formula (1) and/or as research tools and/or diagnostic aids in relation to IJP.

The term 'colorant' as used herein includes both dyes and pigments. Colorants are not limited to materials which solely provide colour in the visible region of the electromagnetic (EM) spectrum but include materials (which may be visibly colourless or weakly coloured) which attenuate radiation in other regions of the EM spectrum invisible to the naked eye [e.g. ultra-violet (UV) and/or infra-red (IR) absorbers]. Compounds of the present invention may exhibit such colorant properties outside the visible region.

Compounds of Formula (1) may be prepared by the methods described below and by other suitable methods analogous to those described in the art for similar phthalocyanine compounds. A preferred method for preparing one or more compounds of Formula (1) comprises the following steps:

(i) condensing one or more compounds of Formula (3)

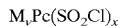 Formula(3)

with an amine of formula $NH_2Ar$;

(ii) treating the adduct from step (i) with a base, to produce one or more compounds of Formula (1);

where v, x, M, Pc, and Ar are as represented herein.

Preferably in step (i) the amine is present in approximately x equivalents to the amount of phthalocyanine compound.

Preferably in step (ii) the base comprises sodium hydroxide and the pH of the mixture may be adjusted to be from 7.0 to 9.0, preferably 8.0.

Compounds of Formula (3) may be prepared using known methods. A preferred method preparing these compounds comprises heating (preferably for about 1 to about 24 hours), a metal-free or metal containing phthalocyanine (optionally comprising an average of two to four sulpho groups per molecule) with chlorosulphonic acid, preferably at a temperature above 60° C., more preferably above 100° C., most preferably from 120° C. to 165° C. Optionally this may be followed cooling, preferably to a temperature from 30° C. to 50° C. The phthalocyanine is then heated with $PCl_3$ (conveniently for about 4 to about 6 hours), preferably at lower temperature than with the chlorosulphonic acid, more preferably from 80° C. to 105° C.

The reactions leading to the formation of the present compounds may be performed under conditions that have been described in the art and compounds of Formula (1) may be isolated by known methods such as spray drying or precipitation followed by filtration.

In a further aspect of the present invention there is provided an ink which is effective for use in ink jet printing, the ink comprising a fluid medium, (optionally a liquid) and a colorant (preferably a dye) comprising one or more compounds of the present invention as defined herein.

Preferably the ink of the present invention comprises:

(a) from 0.01 to 30 parts of a compound of Formula (1); and (b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage. If desired further colorants may be added to the ink to produce the desired colour or shade, although if a cyan ink is desired this is not normally necessary because of the strong, attractive cyan colour of the compounds of the present invention.

Preferred liquid media include water, a mixture of water and an organic solvent and an organic solvent free from water. When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:

$C_{1-6}$-alkanols, preferably methanol, ethanol, n-propanol, isopropanol, n-butanol, sec-butanol, tert-butanol, n-pentanol, cydopentanol and/or cyclohexanol;

amides, preferably linear amides, more preferably dimethylformamide and/or dimethylacetamide;

ketones and/or ketone-alcohols, preferably acetone, methyl ether ketone, cyclohexanone and/or diacetone alcohol;

water-miscible ethers, preferably $C_{2-4}$ethers, more preferably tetrahydrofuran and/or dioxane;

alkylene glycols or thioglycols preferably containing a $C_2$–$C_{16}$ alkylene group, more preferably diols such as $C_{2-12}$diols (for example pentane-1,5-diol, ethylene glycol, propylene glycol, butylene glycol, pentylene glycol, hexylene glycol and/or thiodiglycol) and/or oligo-and/or poly-(alkyleneglycols and/or thioglycols) for example diethylene glycol, thiodiglycol, triethylene glycol, polyethylene glycol, polypropylene glycol and/ or polyols, e.g. glycerol and 1,2,6-hexanetriol;

triols, preferably glycerol and/or 1,2,6-hexanetriol;

lower alkyl glycol and polyglycol ethers, e.g. $C_{1-4}$alkyl ethers of diols, preferably mono$C_{1-4}$alkyl ethers of $C_{2-12}$diols: {for example 2-methoxyethanol; 2-(2-methoxyethoxy)ethanol; 2-(2-ethoxyethoxy)-ethanol; 2-(2-butoxyethoxy)ethanol; 3-butoxypropan-1-ol; 2-[2-(2-methoxyethoxy)ethoxy]ethanol; 2-[2-(2-ethoxyethoxy)-ethoxy]ethanol and/or ethyleneglycol monoallyl ether};

cyclic amides, e.g. optionally substituted pyrollidones, preferably 2-pyrrolidone, N-methyl-2-pyrrolidone, N-ethyl-2-pyrrolidone, caprolactam and/or 1,3-dimethylimidazolidone; cyclic esters, preferably caprolactone;

sulphoxides, preferably dimethyl sulphoxide and/or sulpholane; and/or mixtures containing two or more of the aforementioned water-miscible organic solvents.

More preferred water-soluble organic solvents are selected from: cyclic amides (e.g. 2-pyrrolidone, N-methylpyrrolidone and N-ethyl-pyrrolidone); diols, (e.g. 1,5-pentane diol, ethyleneglycol, thiodiglycol, diethyleneglycol and triethyleneglycol);

$C_{1-6}$-alkyl mono ethers of $C_{2-6}$-alkylene glycols;

$C_{1-4}$alkyl ethers of diols (e.g. 2-methoxy-2-ethoxy-2-ethoxyethanol);

$C_{1-6}$-alkyl mono ethers of poly($C_{2-6}$-alkylene glycols); and mixtures thereof.

One preferred liquid medium comprises: from 75 to 95 parts water; and from 25 to 5 parts in total of one or more solvents selected from: diethylene glycol, 2-pyrrolidone, thiodiglycol, N-methylpyrrolidone, cyclohexanol, caprolactone, caprolactam and pentane-1,5-diol; where the parts are by weight and the sum of the parts of water and solvent totals 100.

Another preferred liquid medium comprises: from 60 to 80 parts water; from 2 to 20 parts diethylene glycol; and from 0.5 to 20 parts in total of one or more solvents selected from: 2-pyrrolidone, N-methylpyrrolidone, cyclohexanol, caprolactone, caprolactam, pentane-1,5diol and thiodiglycol; where the parts are by weight and the sum of the parts of water, glycol and other solvent(s) totals 100.

Examples of further IJP-effective media for inks of the present invention comprise a mixture of water and one or more organic solvents are described in U.S. Pat. Nos. 4,963,189, 4,703,113, 4,626,284 and EP 0425150-A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof.

Suitable water-immiscible organic solvents comprise: aliphatic hydrocarbons;

chlorinated hydrocarbons (for example dichloromethane);

aromatic hydrocarbons, e.g. toluene, xylene, naphthalene, tetrahydronaphthalene and methyl naphthalene;

chlorinated aromatic hydrocarbons, e.g. chlorobenzene, fluorobenzene, chloronaphthalene and bromonaphthalene;

esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate;

alcohols having six or more carbon atoms, e.g. hexanol, octanol, benzyl alcohol, phenyl ethanol, phenoxy ethanol, phenoxy propanol and phenoxy butanol;

ethers (for example diethyl ether), preferably those ethers having at least 5 carbon atoms, more preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil;

and mixtures of any two or more thereof.

Benzyl alcohol is an especially preferred water-immiscible solvent.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The compound of Formula (1) may be dissolved in the low melting point solid or may be finely dispersed in it.

The compounds of the present invention have particular utility in inks in which component (b) comprises water and a water dissipatable polymer. The water-dissipatable polymer preferably bears ionised carboxy and/or sulphonate groups, especially ionised sulphonate groups, because these assist water dissipatability of the polymer. Such groups can be chain pendant and/or terminal.

Preferably the water dissipatable polymer is selected from one or more polyester, polyacrylate, polyurethane and mixtures thereof. Optionally the water dissipatable polymer may also comprise a colorant, (e.g. a dye) in the polymer chain. The optional colorant may chain extend and/or chain terminate the polymer and/or be incorporated within the polymer chain. One or more compounds of the present invention may comprise the colorant used to form those water dissipatable polymers which are optionally coloured. Preferably the polymer has an average molecular weight below 25,000 daltons. Preferably the water dissipatable polymers can be prepared and have the properties, as described in the applicant's published patent applications for such polymer inks WO 9706217, WO 9814523 WO 9814524 and WO 9814525 and in the applicant's co-pending applications for: polyester containing inks GB 9805782.1, GB 9806809.1, GB 9806810.9, GB 9808812.5, PCT/GB98/01583 and PCT/GB98/01584; polyurethane containing inks: GB 9806788.7, GB 9806789.5, GB 9806790.3 and GB 9806791.1; and polyacrylic containing inks GB 9806793.7.

Preferably inks comprising a water dissipatable polymer are prepared by mixing together (i) a solution of the compound(s) of the present invention in a water-immiscible solvent and (ii) a mixture of a water- dissipatable polymer, water-miscible solvent and optionally water. Equally the inks may be prepared by mixing together (i) a solution of the compound(s) of the present invention in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of the compound(s) of the present invention by the polymer to give intensely coloured inks.

The amount of the compound(s) of the present invention and water-dissipatable polymer contained in the ink will vary according to the depth of shade required. Typically, however, the ink will comprise:

(a) from 0.5 to 15 parts, more preferably 0.8 to 10 parts, especially 1 to 5 parts in total of the compound(s) of the present invention;

(b1) from 0.2 to 25 parts, more preferably 2 to 15 parts of a water-dissipatable polymer;

(b2) from 40 to 90 parts, more preferably from 50 to 80 parts of water; and (b3) from 0 to 60 parts, more preferably 0 to 40 parts of organic solvent;

where all parts are by weight and the total number of parts of (a)+(b1)+(b2)+(b3) add up to 100. The number of parts of the water-dissipatable polymer is calculated on a 100% solids basis. For example 50 g of a 20% solids polymer is taken as 10 g of polymer.

The optional organic solvent, mentioned in (b3) above, present in these polymer containing inks may contain an organic solvent and this may be a mixture of organic solvents. In a preferred embodiment the ink contains an organic solvent consisting of a water-miscible organic solvent and a water-immiscible organic solvent (such as one or more of those described previously).

Component (b3) of the above mentioned polymer containing inks preferably comprises;

(i) 5% to 50% of a water-immiscible alcohol having at least six carbon atoms, more preferably benzyl alcohol; and (ii) 50% to 95% of a water-miscible solvent comprising:
(1) a cyclic ester or cyclic amide, more preferably an optionally substituted pyrrolidone, [e.g. 2-pyrrolidone, dimethyl pyrrolidone, N-methyl-2-pyrrolidone, N-ethyl-2-pyrrolidone and N-(2-hydroxyethyl)-2-pyrrolidone and mixtures thereof];
(2) a water-miscible $C_{1-6}$-alkyl mono ether of a $C_{2-6}$-alkylene glycol or $C_{1-6}$-alkyl mono ether of poly($C_{2-6}$-alkylene glycol); or any mixtures of (1) and (2). All percentages are by weight and add up to 100%.

The water-immiscible solvent preferably has a solubility in water at 20° C. of up to 50 g/l. The water-miscible solvent preferably has a solubility in water at 20° C. of more than 50 g/l.

The ratio of water-miscible organic solvent to water-immiscible organic solvent is preferably 19:1 to 1:1, more preferably 8:1 to 1:1, especially 5:1 to 1:1.

A further feature of the invention provides a composition comprising a water-dissipatable polymer and a compound of Formula (1). In these compositions the preferred water-dissipatable polymers and compounds of the invention are as described herein. Such compositions may be dissipated in water and optionally mixed with further ingredients to give in ink, for example with one or more organic solvents. These compositions preferably comprises (a) 0.125 to 40 parts of a colorant (more preferably the colorant consists only of compounds of the present invention); and (b) 99.875 to 60 parts of the water-dissipatable polymer, where the total number of parts of (a) and (b) adds up to 100.

The inks of the present invention may also contain additional components conventionally used in inks for IJP, for example viscosity and surface tension modifiers, corrosion inhibitors, biocides, kogation reducing additives and surfactants which may be ionic or non-ionic.

Preferably for use in the inks of the present invention compounds of Formula 1 are dyes. Use of dyes has advantages over the use of pigments in that less dye is usually required than would be the case for a pigment, expensive milling is avoided, the inks are less likely to form a precipitate on standing, a far greater variety of shades are available and the resultant prints have good transparency.

A valuable feature of inks of the invention is the low tendency for blocking the nozzles of thermal ink jet printers. This is particularly difficult to achieve for polymer containing inks. Many other water dispersible polymer inks work poorly or even not at all in thermal printers. The inks of the invention (including those that comprise the water dissipatable polymers) form discrete droplets on the substrate with little tendency for diffusing. Consequently sharp images can be obtained, resulting in excellent print quality and little if any bleed between colours printed side-by side. The inks of the present invention benefit from good light- and water-fastness.

A further aspect of the invention provides a process for printing an image on a substrate comprising applying to the substrate by means of an ink jet printer, an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir (e.g. by means of a resistor adjacent to the orifice) thereby causing the ink to be ejected in the form of small droplets directed towards the substrate during relative movement between the substrate and the orifice. In piezoelectric ink jet printers the oscillation of a small crystal causes ejection of the ink from the orifice.

A further aspect of the present invention provides a substrate which has applied thereon an ink of the present invention as defined herein and/or one or more compounds of the present invention as defined herein.

The substrate preferably comprises paper, plastic, a textile, metal or glass, more preferably paper, an overhead projector slide or a textile material, especially paper.

Preferred papers are plain or treated papers which may have an acid, alkaline or neutral character.

Preferably the ink and/or compounds of the present invention have been applied to the substrate by a printed process, more preferably the process of the present invention as defined herein.

When the substrate is a textile material the ink according to the invention is preferably applied thereto by:
i) applying the ink to the textile material using an ink jet printer; and
ii) heating the printed textile material at a suitable temperature, preferably from 50° C. to 250° C., to fix the ink on the material.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

A further feature of the present invention is a cartridge suitable for use in an ink jet printer containing an ink according to the invention. Also there is provided an ink jet printer containing an ink according to the invention.

The invention is further illustrated by the following Example in which all parts and percentages are by weight unless otherwise stated.

EXAMPLE 1

Preparation of

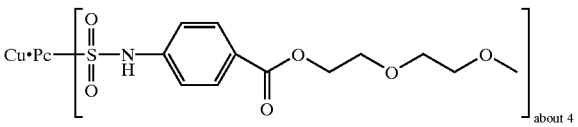

a) Preparation of $CuPc(SO_2Cl)_4$

Copper phthalocyanine (14.4 g) was added in portions to stirred chlorosulphonic acid (50 ml) keeping the temperature at or below 40° C. The reaction mixture was heated to 150° C. over one hour, at which temperature it was stirred for 6 hours.

The mixture was allowed to cool to 65° C. and phosphorus trichloride (8.75 ml) was added dropwise. The reaction mixture was slowly heated to 90° C. and maintained at this temperature for 16 hours, then cooled to about 10° C. and poured onto a mixture of ice and water (350 ml). The blue, precipitated product was collected by filtration at reduced pressure and washed with ice-cold water to obtain a paste which was used directly in step (c).

(b) Preparation of the amine:

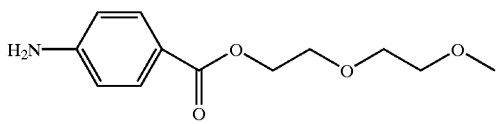

4-Nitrobenzoyl chloride was reacted with 2-(2-methoxyethoxy) ethanol in dichloromethane in the presence of triethylamine. The nitro group in the resultant product was reduced by catalytic hydrogenation to obtain the above amine.

(c) Preparation of Title Dye

The product from stage (a) was added in portions to a suspension of the amine [26.3 g, prepared as described in step (b)] in water (300 ml) at 40° C. and pH from 8.5 to 9.0. The reaction mixture was stirred for 30 minutes at 40° C. and then heated to 80° C. for two hours whilst the pH was maintained from 8.5 to 9.0. The reaction mixture was added to water (500 ml) then sodium chloride (10% w/v) was added and the pH of the mixture was adjusted to 2.0 with concentrated hydrochloric acid. The resultant precipitate was collected by filtration at reduced pressure and washed with acidified brine (5%, 500 ml). The solids were collected by filtration under reduced pressure and purified by addition to ethyl acetate to form a slurry from which the solids were again isolated by filtration under reduced pressure to obtain as the product 21.4 g of the title dye ($\lambda_{max}$=672 nm).

Preparation of a Resin Component of an Ink ("the Resin")

To a glass reactor fitted with distillation column and condenser were charged the following ingredients: neopentyl glycol (15 g); diethylene glycol (10 g); sodio-5-sulphoisophthalic acid (10 g); hexane-1,6-diol (10 g); methoxy PEG 750 (10 g); sodium acetate (0.2 g); isophthalic acid (22.5 g); and Fascat 4101 (0.05 g). The contents were heated with stirring to a reaction temperature of 210° C. until the mixture was clear and the acid value was <10 mgKOH per g. At this point the a further 22.5 g of isophthalic acid and 0.05 g of Fascat 4101 were added to the reaction vessel and the temperature raised to 230° C. The reaction was continued under reduced pressure until an acid value of 9.4 mg KOH per g was obtained. The polymer was further characterised by a hydroxyl value of 12.8 mg KOH per g; ICI Cone and Plate Viscosity @ 125° C. of >500 poises and a $T_g$ (onset) of 18° C. The number average molecular weight as determined by gel permeation chromatography (PS Equivalents) was 1800. The polymer obtained was readily dispersed in warm distilled water to give a clear solution having a solids content of 20% w/w (hereinafter referred to as the "Resin").

Inks

The effectiveness in ink jet printing of compounds of Formula (1) was demonstrated as follows.

The dye of Example 1 (3 g) was dissolved in benzyl alcohol (10 g) and 2-pyrrolidone (20 g). A solution (50 g) of the Resin (20% resin w/w, at pH 8.9) was dissipated in water (18 g). This resin solution was then mixed with the dye solution and shaken to give a homogeneous ink which was stable for two months at room temperature.

This ink was printed onto the papers listed in below using a Olivetti JP 450 ink jet printer to give cyan prints the properties of which are summarised in the following table:

| Paper | OD | LF | WF |
|---|---|---|---|
| XA | 0.849 | 6.05 | 10 |
| WC | 0.730 | 4.73 | 9 | where:

XA denotes Xerox Acid 4024 paper from Rank Xerox.

WC denotes Wiggins Conqueror High White Wove 100 $gm_{-2}$ paper from Arjo Wiggins Appleton.

OD denotes the optical density of a print, measured using an X-Rite 938 Spectrodensitometer. LF denotes light fastness, determined by the change in L.a.b coordinates as measured by an X-Rite 938 Spectrodensitometer after the print has been irradiated ($\Delta E$) for 100 hrs in a Atlas Ci35A Weatherometer. A low figure indicating high light-fastness. WF denotes wet fastness, determined by running water (0.5 ml) down lines of print at an angle of approximately 45° C. immediately after the lines had been printed. The prints were given a score of 1–10 where 1 indicates poor wet fastness and 10 indicates no detected ink run down (i.e. 100% water fast).

Further inks may be prepared having the formulations described in tables below. These inks may be applied to any suitable media (e.g. the papers given above) using an ink jet printer. In the tables R denotes the Resin prepared as described above, (comprising 20% solids and 80% water). The number of parts by weight of the respectively the dye of Example 1 and the Resin are shown in the columns headed Dye and R respectively. The following abbreviations are also used in the tables:

| | | |
|---|---|---|
| 2P is 2-pyrollidone; | ACE is acetone; | AS is $(NH_4)_2SO_4$; |
| BUT is butyl cellosolve; | BZ is benzyl alcohol; | CAP is caprolactam; |
| DEG is diethylene glycol; | DMB is diethyleneglycol monobutyl ether; | |
| FRU is fructose; | GLY is glycerol; | IPA is isopropyl alcohol; |
| MA is $CH_3NH_2$; | MEOH is methanol; | MIBK is methylisobutyl ketone; |
| NMP is N-methyl pyrollidone; | | PHO is $K_2PO_4$; |
| R is the Resin; | SUR is Surfynol 465 (a surfactant); | |
| TDG is thiodiglycol; | TEN is triethanolamine; and W is water. | |

TABLE I

| Dye | W | R | BZ | DEG | 2P | MIBK | BUT |
|---|---|---|---|---|---|---|---|
| 2.0 | 58 | 10 | 4 | 6 | 10 | 10 | |
| 2.1 | 60.9 | 6 | 8 | | 20 | 1 | 2 |
| 1.8 | 63.2 | 10 | 5 | | 15 | | 5 |

TABLE I-continued

| Dye | W | R | BZ | DEG | 2P | MIBK | BUT |
|---|---|---|---|---|---|---|---|
| 1.0 | 63 | 7 | 5 | 4 | 15 | 5 | |

TABLE II

| Dye | W | R | BZ | DEG | ACE | IPA | 2P | MIBK |
|---|---|---|---|---|---|---|---|---|
| 5.0 | 54 | 5 | 15 | 3 | 3 | 6 | 5 | 4 |
| 5.0 | 50 | 15 | 20 | | | 10 | | |
| 5.0 | 70 | 10 | 6 | 2 | 2 | 1 | 4 | |

TABLE II-continued

| Dye | W | R | BZ | DEG | ACE | IPA | 2P | MIBK |
|---|---|---|---|---|---|---|---|---|
| 2.0 | 62.7 | 5 | 10 | | 7 | 3 | 10 | |
| 5.4 | 49.6 | 4 | 20 | 2 | 1 | | 15 | 3 |

TABLE III

| Dye | W | R | BZ | DEG | NaOH | 2P |
|---|---|---|---|---|---|---|
| 3.0 | 61.8 | 10 | 5 | 5 | 0.2 | 15 |

TABLE IV

| Dye | W | R | BZ | ACE | MEOH | 2P | MIBK | BUT |
|---|---|---|---|---|---|---|---|---|
| 2.4 | 51.6 | 5 | 4 | 5 | 6 | 20 | 5 | 1 |
| 3.3 | 63.7 | 12 | 5 | 5 | 2 | | 6 | 3 |

TABLE V

| Dye | W | R | BZ | NaOH | AS | 2P | MIBK | BUT |
|---|---|---|---|---|---|---|---|---|
| 1.1 | 61.9 | 12 | 9 | 0.5 | 0.5 | 9 | 5 | 1 |

TABLE VI

| Dye | W | R | BZ | DEG | ACE | AS |
|---|---|---|---|---|---|---|
| 4.1 | 68.6 | 10 | 5 | 2 | 10 | 0.3 |

TABLE VII

| Dye | W | PG | BZ | DEG | ACE | IPA | MEOH | 2P | MIBK |
|---|---|---|---|---|---|---|---|---|---|
| 3.2 | 57.8 | 4 | 5 | 4 | 6 | 5 | 4 | 6 | 5 |

TABLE VIII

| Dye | W | R | BZ | NMP | SUR | TEN | TDG | FRU | PHO | DMB |
|---|---|---|---|---|---|---|---|---|---|---|
| 1.5 | 63 | 10 | 5 | | 0.15 | 0.5 | 20 | | | |
| 0.9 | 63 | 5 | 10 | 20 | | | | 0.5 | 0.2 | |
| 2.2 | 67 | 10 | 10 | 3 | | | | 2 | | 6 |
| 9.0 | 34 | 15 | 19 | 17 | | 0.5 | | | 0.95 | 5 |
| 5.4 | 54 | 12 | 5 | 17 | | | | | | 7 |
| 2.1 | 65 | 15 | 5 | 5 | 0.1 | 0.2 | 2 | 0.5 | 0.1 | 5 |
| 2 | 56 | 10 | 10 | 5 | | | 12 | | | 5 |
| 10 | 63 | 13 | 2 | | | | | | | 12 |

TABLE IX

| Dye | W | R | BZ | NMP | SUR | TEN | TDG | DMB | MA | CAP |
|---|---|---|---|---|---|---|---|---|---|---|
| 3.1 | 64 | 10 | 8 | | 0.3 | | 15 | | 0.2 | |
| 8.0 | 40 | 15 | 15 | 15 | | | 5 | | | 2 |
| 5.0 | 57 | 10 | 11 | | | | 10 | 6 | | 1 |
| 8.0 | 42 | 20 | 15 | 8 | | | | 5 | | 2 |

TABLE X

| Dye | W | R | BZ | NMP | FRU | PHO | DMB | MA | CAP |
|---|---|---|---|---|---|---|---|---|---|
| 2.5 | 60 | 15 | 6 | 15 | | 0.12 | | | 4 |
| 4.0 | 67 | 10 | 10 | 4 | 1 | | 4 | 0.2 | |

What is claimed is:

1. An ink comprising:

i) a compound of Formula (1) and salts thereof:

$$M_vPc(SO_2NHAr)_x \quad \text{Formula (1)}$$

in which:

M represents a metal or H;
Pc represents a phthalocyanine nucleus;
Ar represents an aromatic moiety optionally substituted by one or more groups selected from the groups consisting of an optionally substituent or optionally substituted $C_{1-3}$carbyl;
v is the valence of Pc divided by the valence of M; and
x is from 2.5 to 4.5;

ii) water; and iii) a water dissipatable polymer.

2. An ink according to claim 1 wherein in the compound of Formula (1):

M is Cu or Ni,

Ar is a aryl group optionally substituted by one or more groups selected from the group consisting of halo; cyano, nitro, optionally substituted $C_{1-18}$hydrocarbyl; $COOR^1$; $OCOR^1$; $COR^1$; $COCOR^1$; $SO_2R^1$; $SO_2R^1$; $OSO_2R^1$; $NHCOR^1$ and $CONHR^1$; where $R^1$ independently represents H or optionally substituted $C_{1-18}$hydrocarbyl; and any of the above hydrocarbyl groups may independently be optionally interrupted by one or more of —O—; —CO—; —OCO—; —COO—; —S—; —SO—and —$SO_2$.

3. An ink according to claim 1 or claim 2 wherein in the compound of Formula (1):

M is Cu;

Ar is phenyl optionally substituted by one or more groups selected from the group consisting of halo; cyano, nitro, optionally substituted $C_{1-12}$alkyl; optionally substituted $C_{1-12}$alkenyl; optionally substituted $C_{1-12}$alkynyl; optionally substituted aryl; $COOR^1$; $OCOR^1$; $COR^1$; $COCOR^1$; $SO_2R^1$; $SO_2OR^1$; $OSO_2R^1$; $NHCOR^1$ and $CONHR^1$; where $R^1$ independently represents H or optionally substituted $C_{1-12}$alkyl; optionally substituted $C_{1-12}$alkenyl; optionally substituted $C_{1-12}$alkynyl; and any of the above alkyl, alkenyl and alkynyl groups may independently be optionally interrupted by one or more of —O—; —CO—; —OCO—; —COO—; —S—; and —$SO_2$.

4. An ink according to claim 1 wherein in the compound of Formula (1):

M is Cu,

Ar is phenyl optionally substituted by one or more groups selected from the groups consisting of halo; cyano, nitro, optionally substituted $C_{1-8\ alkyl}$; $COOR^1$; $OCOR^1$; $COR^1$; $COCOR^1$; where $R^1$ independently represents H or optionally substituted $C_{1-8}$alkyl; and any of the above alkyl groups may independently be optionally interrupted by one or more of —O—; —CO—; —OCO—; and —COO—.

5. An ink according to any one of the preceding claims comprising:

(a) from 0.5 to 15 parts of a compound of Formula (1)

(b1) from 0.2 to 25 parts of a water-dissipatable polymer;

(b2) from 40 to 90 parts of water; and (b3) from 0 to 60 parts of organic solvent;

where all parts are by weight and the total number of parts of (a)+(b1)+(b2)+(b3) add up to 100.

6. An ink which is effective for use in ink jet printing, the ink comprising a fluid medium and a colorant comprising one or more compounds of Formula (1) according to claim 1.

7. A compound of Formula (1) and salts thereof:

   Formula (1)

in which:

M represents a metal or H;

Pc represents a phthalocyanine nucleus;

Ar represents an aryl group carrying at least one $COOR^1$ substituent where $R^1$ is a $C_{1-18}$ hydrocarbyl interrupted by one or more of —O—; —CO—; —OCO—; —COO—; —S—; —SO—and —$SO_2$;

v is the valence of Pc divided by the valence of M; and x is from 2.5 to 4.5.

8. A process for printing an image on a substrate comprising applying to the substrate by means of an ink jet printer, an ink according to any one of claims 1 to 6.

9. A substrate which has applied thereon, an ink according to any one of claims 1 to 6.

10. A cartridge suitable for use in an ink jet printer containing an ink according to any one of claim 1 to 6.

11. An ink according to claim 3 wherein the optionally substituted aryl is fused to the phenyl ring to form a polycyclic ring system.

12. A substrate which has applied thereon, one or more compounds according to claim 7.

* * * * *